United States Patent
Wu (10) Patent No.: US 11,783,562 B2
(45) Date of Patent: Oct. 10, 2023

(54) OPTICAL FINGERPRINT SENSOR AND ELECTRONIC DEVICE HAVING SAME

(71) Applicant: GUANGDONG OPPO MOBILE TELECOMMUNICATIONS CORP., LTD., Guangdong (CN)

(72) Inventor: Yutong Wu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 70 days.

(21) Appl. No.: 17/540,163

(22) Filed: Dec. 1, 2021

(65) Prior Publication Data

US 2022/0092286 A1    Mar. 24, 2022

Related U.S. Application Data

(63) Continuation of application No. PCT/CN2020/095023, filed on Jun. 9, 2020.

(30) Foreign Application Priority Data

Jun. 24, 2019  (CN) .......................... 201910550616.9

(51) Int. Cl.
*G06V 40/13*    (2022.01)
*G06V 10/143*    (2022.01)
(Continued)

(52) U.S. Cl.
CPC ........ *G06V 10/143* (2022.01); *G06V 40/1318* (2022.01); *G06V 40/1324* (2022.01); *G06V 40/1394* (2022.01); *G06V 40/40* (2022.01)

(58) Field of Classification Search
CPC ............. G06V 10/143; G06V 40/1318; G06V 40/1394; G06V 40/40; G06V 40/1324
See application file for complete search history.

(56) References Cited

U.S. PATENT DOCUMENTS

2009/0147101 A1*  6/2009  Tatani ............... H01L 27/14685
                                                         348/224.1
2010/0225617 A1   9/2010  Yoshimoto et al.
(Continued)

FOREIGN PATENT DOCUMENTS

CN         102623475 A      8/2012
CN         102623476 A      8/2012
(Continued)

OTHER PUBLICATIONS

Extended European Search Report for EP Application 20832302.2 dated Jun. 10, 2022. (11 pages).

(Continued)

*Primary Examiner* — Lixi C Simpson
(74) *Attorney, Agent, or Firm* — Young Basile Hanlon & MacFarlane, P.C.

(57) ABSTRACT

An optical fingerprint sensor and an electronic device having same are provided. The optical fingerprint sensor includes a light-sensing element, an optical filter layer and an optical lens. The light-sensing element includes: a light-sensing base layer having a groove in a side surface thereof; a first light-sensing layer configured to receive visible light and arranged in the groove; and a second light-sensing layer configured to receive invisible light, and arranged between an inner wall surface of the groove and an outer wall surface of the first light-sensing layer. The optical filter layer is stacked on a side of the light-sensing element where the groove is formed. The optical lens is configured for focusing and stacked on a side of the optical filter layer facing away from the light-sensing element.

18 Claims, 8 Drawing Sheets

(51) Int. Cl.
    *G06V 40/12*    (2022.01)
    *G06V 40/40*    (2022.01)

(56) References Cited

U.S. PATENT DOCUMENTS

| | | |
|---|---|---|
| 2011/0248170 A1 | 10/2011 | Holcombe et al. |
| 2013/0075607 A1 | 3/2013 | Bikumandla et al. |
| 2015/0331508 A1 | 11/2015 | Nho et al. |
| 2016/0180139 A1 | 6/2016 | Hung et al. |
| 2017/0124376 A1 | 5/2017 | Wyrwas et al. |
| 2019/0012555 A1* | 1/2019 | Bae .................... G06V 40/1324 |
| 2021/0383089 A1* | 12/2021 | Ye ....................... G06V 40/1394 |

FOREIGN PATENT DOCUMENTS

| | | |
|---|---|---|
| CN | 105390518 A | 3/2016 |
| CN | 105989355 A | 10/2016 |
| CN | 106874866 A | 6/2017 |
| CN | 108345845 A | 7/2018 |
| CN | 109271057 A | 1/2019 |
| CN | 109308431 A | 2/2019 |
| CN | 109564626 A | 4/2019 |
| CN | 109564627 A | 4/2019 |

OTHER PUBLICATIONS

International Search Report with English Translation for PCT Application PCT/CN2020/095023 dated Sep. 23, 2020. (20 pages).
Chinese Office Action with English Translation for CN Application 201910550616.9 dated Jul. 15, 2023. (26 pages).

\* cited by examiner

OPTICAL FINGERPRINT SENSOR AND ELECTRONIC DEVICE HAVING SAME

CROSS-REFERENCE TO RELATED APPLICATION(S)

The present application is a continuation of International Application PCT/CN2020/095023, filed on Jun. 9, 2020, which claims priority to Chinese Patent Application No. 201910550616.9 filed on Jun. 24, 2019, the entire contents of both of which are incorporated herein by reference.

TECHNICAL FIELD

The present disclosure relates to a field of electronic equipment, and more particularly, to an optical fingerprint sensor and an electronic equipment having the same.

BACKGROUND

In the related art, an under-screen optical fingerprint terminal includes a terminal screen and an under-screen fingerprint sensor. The terminal screen includes a glass cover plate and a display panel, and the under-screen fingerprint sensor includes an array composed of several photosensitive elements. The light emitted by the display panel reaches a surface of a finger through the glass cover plate. Due to different reflectivity of the light at a ridge or a valley of the fingerprint, intensities of the light reflected at the ridge or the valley of the fingerprint are also different. The photosensitive elements of the under-screen fingerprint sensor receive the light with different intensities reflected by the surface of the finger to generate a fingerprint image. In this way, a function of under-screen optical fingerprint identification can be realized.

SUMMARY

Embodiments of a first aspect of the present disclosure provide an optical fingerprint sensor. The optical fingerprint sensor includes a light-sensing element, an optical filter layer and an optical lens for focusing. The light-sensing element includes: a light-sensing base layer having a plurality of grooves formed in a side surface thereof; a plurality of first light-sensing layers for receiving visible light, the plurality of first light-sensing layers corresponding to the plurality of grooves one to one, each first light-sensing layer being arranged in the corresponding groove; and a second light-sensing layer for receiving invisible light, the second light-emitting layer being arranged between an inner wall surface of at least part of the plurality of grooves and an outer wall surface of the first light-sensing layer. The optical filter layer is stacked with the light-sensing element and located on a side of the light-sensing element where the plurality of grooves are formed. The optical lens is stacked with the optical filter layer and located on a side of the optical filter layer facing away from the light-sensing element.

Embodiments of a second aspect of the present disclosure provide an electronic device. The electronic device includes a housing, a display screen, a cover plate, an optical fingerprint sensor and an invisible light emitting layer. The display screen is arranged to the housing and defines a mounting space together with the housing. The cover plate is arranged to the housing, stacked with the display screen and located on a side of the display screen facing away from the mounting space. The optical fingerprint sensor includes a light-sensing element, an optical filter layer and an optical lens. The light-sensing element includes: a light-sensing base layer having a plurality of grooves formed in a side surface thereof; a plurality of first light-sensing layers configured to receive visible light, and corresponding to the plurality of grooves one to one, each first light-sensing layer being arranged in the corresponding groove; and a second light-sensing layer configured to receive invisible light, and arranged between an inner wall surface of at least part of the plurality of grooves and an outer wall surface of the first light-sensing layer. The optical filter layer is stacked with the light-sensing element and located on a side of the light-sensing element where the plurality of grooves are formed. The optical lens is configured for focusing, stacked with the optical filter layer and located on a side of the optical filter layer facing away from the light-sensing element. The optical fingerprint sensor is arranged in the mounting space, and the light-sensing base layer is stacked with the display screen. The invisible light emitting layer is configured to emit invisible light towards the cover plate, arranged between the optical fingerprint sensor and the cover plate, stacked with the cover plate and the optical fingerprint sensor, and opposite to the optical fingerprint sensor.

Embodiments of a third aspect of the present disclosure provide another optical fingerprint sensor. The optical fingerprint sensor includes a light-sensing element, an optical filter layer and an optical lens. The light-sensing element includes: a light-sensing base layer having a groove in a side surface thereof; a first light-sensing layer configured to receive visible light and arranged in the groove; and a second light-sensing layer configured to receive invisible light, and arranged between an inner wall surface of the groove and an outer wall surface of the first light-sensing layer. The optical filter layer is stacked on a side of the light-sensing element where the groove is formed. The optical lens is configured for focusing and stacked on a side of the optical filter layer facing away from the light-sensing element.

Additional aspects and advantages of the present utility model will be given in part in the following description, become apparent in part from the following description, or be learned from the practice of the present disclosure.

BRIEF DESCRIPTION OF DRAWINGS

The above and/or additional aspects and advantages of the present disclosure will become apparent and easy to understand from following descriptions of embodiments in combination with accompanying drawings.

DETAILED DESCRIPTION

Embodiments of the present disclosure are described in detail below, and examples of the embodiments are shown in accompanying drawings. The same or similar elements or the elements having same or similar functions are denoted by the same or similar reference numerals throughout the descriptions. The following embodiments described with reference to the accompanying drawings are exemplary and are only intended to explain the present disclosure, rather than limit the present disclosure.

An optical fingerprint sensor 10 according to the embodiments of the present disclosure is described below with reference to the accompanying drawings.

Figure 1:
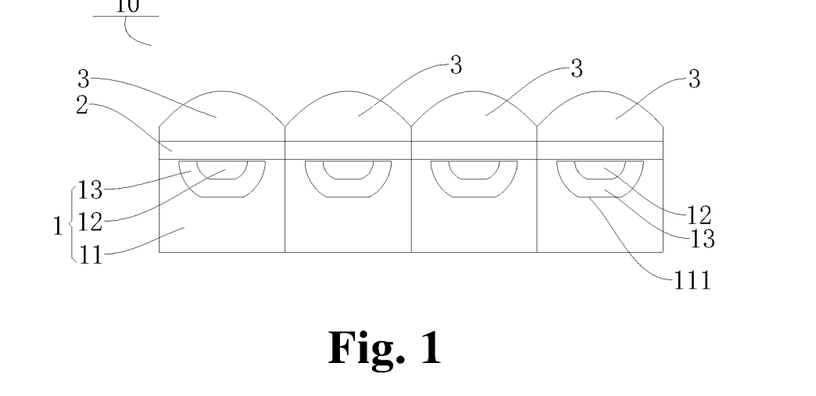
FIG. 1 is a sectional view of an optical fingerprint sensor according to an embodiment of the present disclosure.

As shown in FIG. 1, the optical fingerprint sensor 10 according to the embodiments of the present disclosure includes a light-sensing element 1, an optical filter layer 2 and an optical lens for focusing.

In some embodiments of the present disclosure, the light-sensing element 1 includes a light-sensing base layer 11 and a first light-sensing layer 12 for receiving visible light. A plurality of grooves 111 are formed in a side surface of the light-sensing base layer 11, a plurality of first light-sensing layers 12 are provided, the plurality of first light-sensing layers 12 correspond to the plurality of grooves 111 one to one, and the first light-sensing layer 12 is arranged in the corresponding groove 111. The first light-sensing layer 12 can receive the visible light and convert a visible light signal into an electrical signal that can be recognized by an electronic device 100, so as to generate a fingerprint image. A second light-sensing layer 13 for receiving invisible light is arranged between an inner wall surface of at least part of the plurality of grooves 111 and an outer wall surface of the first light-sensing layer 12. It can be understood that the second light-sensing layer 13 for receiving the invisible light is arranged between the inner wall surface of a part of the plurality of grooves 111 and the outer wall surface of the first light-sensing layer 12, or the second light-sensing layer 13 for receiving the invisible light is arranged between the inner wall surface of each groove 111 and the outer wall surface of the first light-sensing layer 12. The second light-sensing layer 13 can receive the invisible light and convert an invisible light signal into the electrical signal that can be recognized by the electronic device 100, so as to generate the fingerprint image.

The second light-sensing layer 13 covers the surface of the first light-sensing layer 12 opposite to the inner wall surface of the groove 111. Thus, it is convenient for the second light-sensing layer 13 to receive the invisible light and for an electrical connection of the second light-sensing layer 13. Moreover, since the first light-sensing layer 12 for receiving the visible light and the second light-sensing layer 13 for receiving the invisible light are integrated into one groove 111, the invisible light signal can be received without reducing a reception resolution of the visible light, thus improving the resolution of the optical fingerprint sensor 10.

In one example of the present disclosure, the first light-sensing layer 12 and the second light-sensing layer 13 may be a photodiode.

Figure 8:
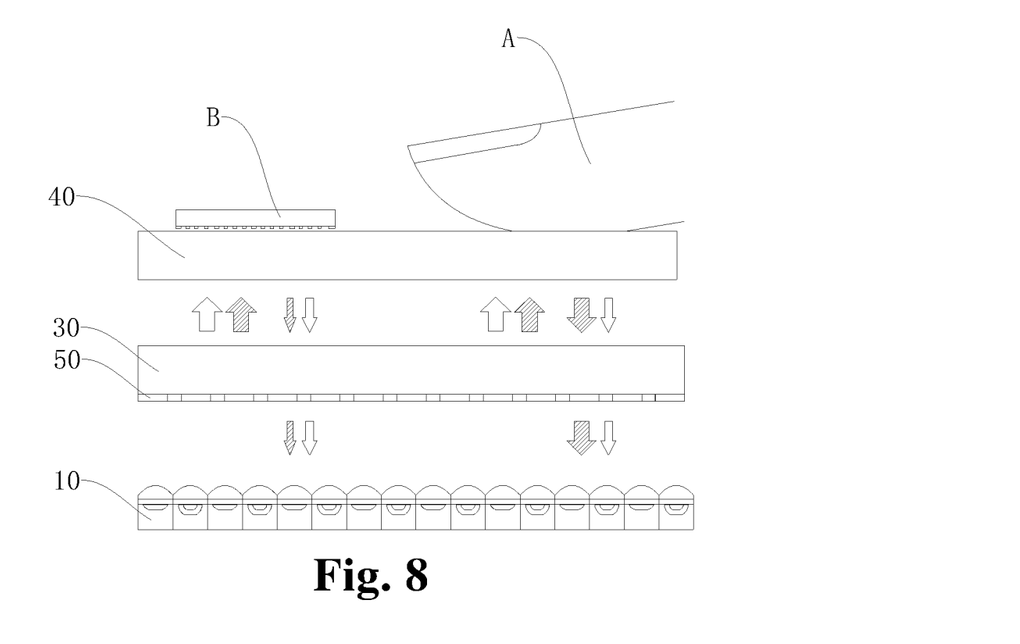
FIG. 8 is a sectional view of a partial structure of an electronic device according to an embodiment of the present disclosure.
Figure 9:
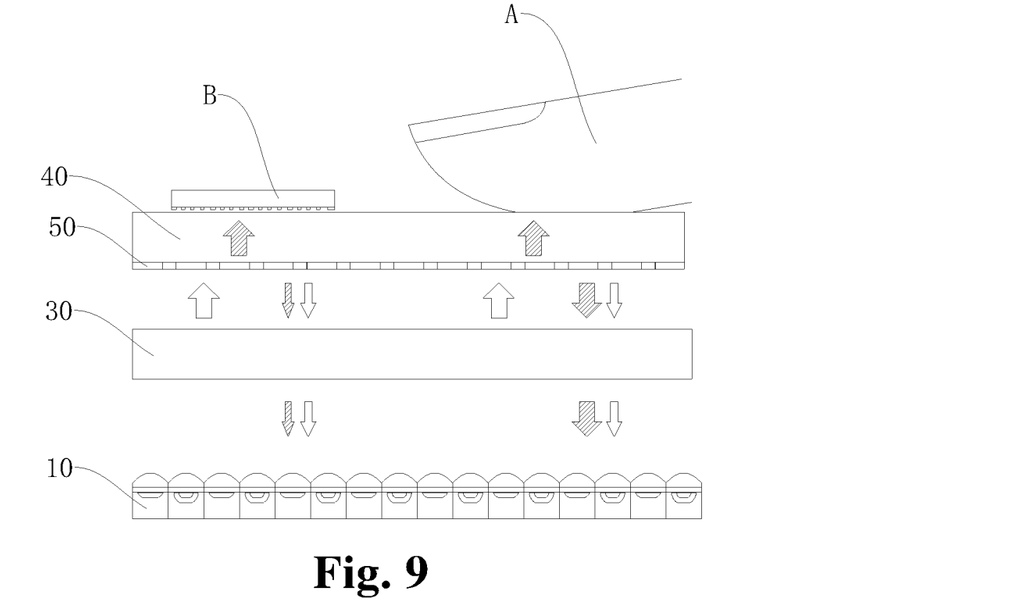
FIG. 9 is a sectional view of a partial structure of an electronic device according to another embodiment of the present disclosure.
Figure 10:
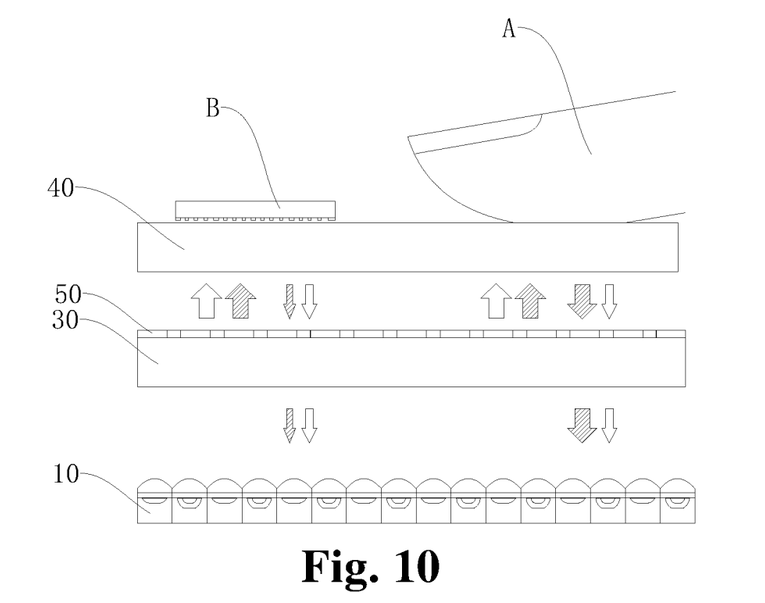
FIG. 10 is a sectional view of a partial structure of an electronic device according to still another embodiment of the present disclosure.

The first light-sensing layer 12 can receive the visible light, and the second light-sensing layer 13 can receive the invisible light, so that the light-sensing element 1 can receive both the visible light signal and invisible light signal for fingerprint imaging. When the optical fingerprint sensor 10 is used for the electronic device 100 for fingerprint identification, it can emit the visible light and the invisible light to an identification object (a false finger or a real finger). Due to different spectral reflection characteristics of the false finger and the real finger, the real finger (a living finger) has special reflection and absorption characteristics for the invisible light, especially the invisible light near the red light band. Thus, the invisible light such as the invisible light near the red light band reflected by surfaces of the real finger and the false finger also has different components. The invisible light such as the invisible light near the red light band reflected by the real finger has a greater component than that reflected by the false finger. As shown in FIGS. 8 to 10, a hollow arrow represents the visible light and a solid arrow represents the invisible light. Moreover, due to the spectral characteristics of the real finger (the living finger), the real finger itself can also emit the invisible light near the red light band, so that an intensity of the invisible light reflected by the real finger to the optical fingerprint sensor 10 is greater than an intensity of the invisible light reflected by the false finger to the optical fingerprint sensor 10. Therefore, even if the fingerprint images generated by the visible light reflected by the real finger and the false finger to the optical fingerprint sensor 10 are the same, the optical fingerprint sensor 10 can also effectively distinguish the real finger and the false finger (a non-living finger) by identifying images generated by this invisible light. Thus, the security of the electronic device 100 using the optical fingerprint sensor 10 is improved, and the ability of the device resisting the attack from the false finger is improved.

It should be noted that an image generated by the invisible light reflected by the real finger to the optical fingerprint sensor 10 and an image generated by the invisible light reflected by the false finger to the optical fingerprint sensor 10 have different definitions and different shapes.

The optical filter layer 2 is stacked with the light-sensing element 1 and located on a side of the light-sensing element 1 where the groove 111 is arranged. The optical filter layer 2 is configured to filter the light reflected by the finger, accurately pick out required visible light components and invisible light components, and remove other light components. The optical lens is stacked with the optical filter layer 2 and is located on a side of the optical filter layer 2 facing away from the light-sensing element 1. The optical lens has a function of focusing, and focuses the visible light and the invisible light onto the first light-sensing layer 12 and the second light-sensing layer 13 of the light-sensing element 1.

In the optical fingerprint sensor 10 according to the embodiments of the present disclosure, the first light-sensing layer 12 for receiving the visible light is arranged in the plurality of grooves 111 of the light-sensing element 1, and the second light-sensing layer 13 for receiving the invisible light is arranged between the inner wall surface of the at least part of the plurality of grooves 111 and the outer wall surface of the first light-sensing layer 12, so that the optical fingerprint sensor 10 can receive both the visible light signal and the invisible light signal. Therefore, the fingerprint image can be generated by receiving the visible light reflected by the finger, and the authenticity of the fingerprint to be tested can be effectively distinguished by the image generated by receiving the invisible light such as the invisible light near the red light band reflected by the finger. The false fingerprint can be effectively identified, and the security of the electronic device 100 using the optical fingerprint sensor 10 is improved.

Figure 2:
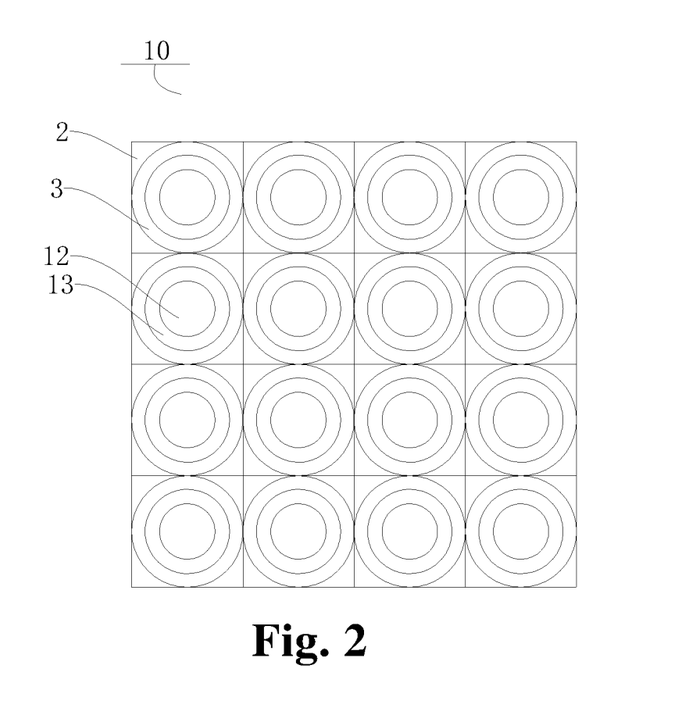
FIG. 2 is a top view of an optical fingerprint sensor according to an embodiment of the present disclosure.

In some embodiments of the present disclosure, as shown in FIG. 2, the plurality of grooves 111 are arranged in rows and columns, so that a structure of the light-sensing element 1 can be simplified, thereby simplifying a structure of the optical fingerprint sensor 10. Moreover, the plurality of first light-sensing layers 12 can be arranged more regularly and the imaging effect can be better. Of course, the present disclosure is not limited to this. The plurality of grooves 111 may not be arranged in rows or columns, that is, the plurality of grooves 111 may be arranged randomly.

Further, as shown in FIG. 2, the second light-sensing layer 13 is arranged in each groove 111. Thus, the definition of the image generated by receiving the invisible light such as the invisible light near the red light band reflected by the finger can be increased, and the accuracy of distinguishing the authenticity can be improved.

Figure 3:
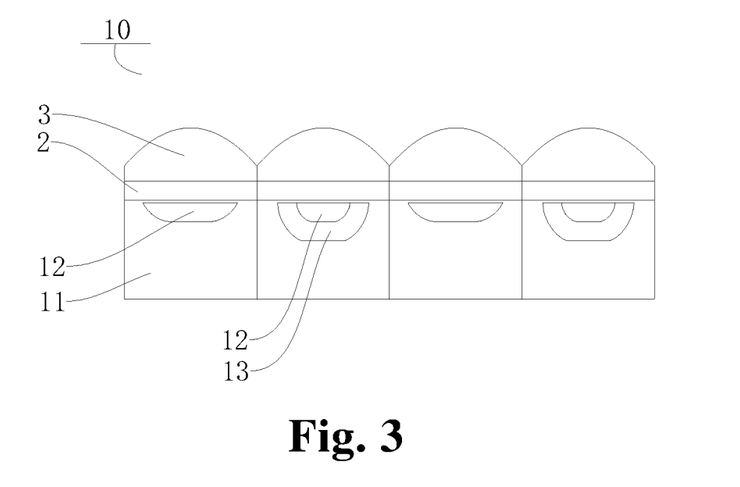
FIG. 3 is a sectional view of an optical fingerprint sensor according to another embodiment of the present disclosure.
Figure 4:
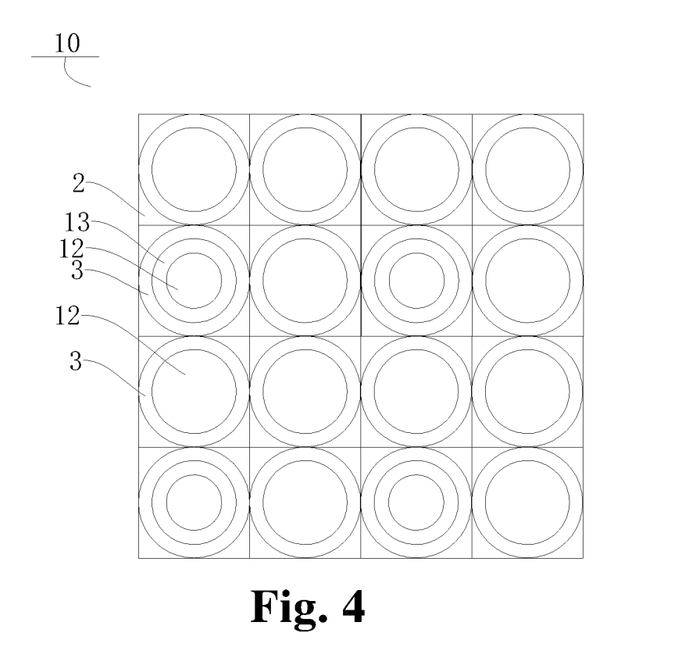
FIG. 4 is a top view of an optical fingerprint sensor according to another embodiment of the present disclosure.
Figure 5:
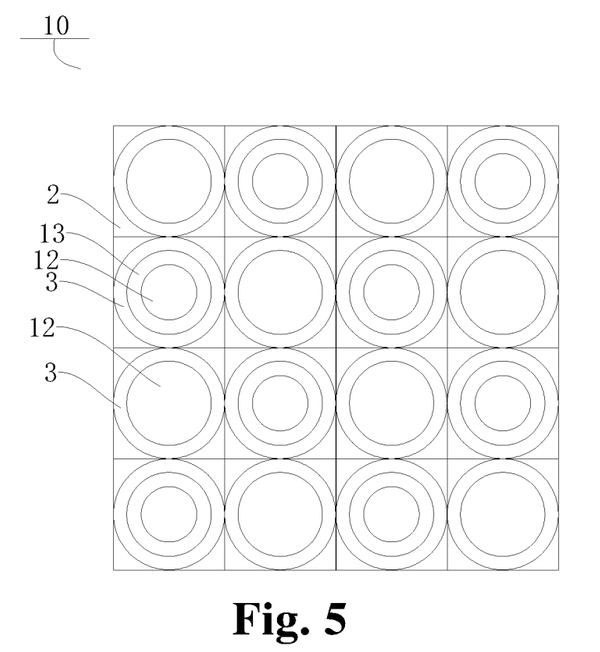
FIG. 5 is a top view of an optical fingerprint sensor according to still another embodiment of the present disclosure.

Of course, the present disclosure is not limited to this. Since the invisible light such as the invisible light near the red light band for distinguishing the fingerprint authenticity does not require a high imaging resolution, the groove 111 provided with the second light-sensing layer 13 and the groove 111 not provided with the second light-sensing layer 13 can be staggered among the grooves 111 located in the same row, as shown in FIGS. 3 to 5. Only the visible light signal is received in an area of the groove 111 provided with only the first light-sensing layer 12, so as to avoid reducing a density of the first light-sensing layers 12 receiving the visible light due to the reception of the invisible light signal, thus improving the resolution of the optical fingerprint sensor 10. The visible light signal and the invisible light signal can be received in an area of the groove 111 provided with the first light-sensing layer 12 and the second light-sensing layer 13. Thus, the cost of the light-sensing element 1 can be reduced, so that the cost of the optical fingerprint sensor 10 can be reduced.

Further, as shown in FIG. 5, the groove 111 provided with the second light-sensing layer 13 and the groove 111 not provided with the second light-sensing layer 13 are staggered among the grooves 111 located in the same column. Thus, the cost of the light-sensing element 1 can be further reduced, so that the cost of the optical fingerprint sensor 10 is reduced. Further, as shown in FIG. 5, the first light-sensing layers 12 in two adjacent rows are staggered. Thus, the second light-sensing layers 13 can be distributed more uniformly, the definition of the image generated by receiving the invisible light such as the invisible light near the red light band reflected by the finger can be increased, and the accuracy of distinguishing the authenticity can be improved.

As shown in FIG. 1 and FIG. 3, the first light-sensing layer 12 and the second light-sensing layer 13 are flush with a surface of the light-sensing base layer 11 facing towards the optical filter layer 2. Thus, the effect of the first light-sensing layer 12 and the second light-sensing layer 13 receiving the light can be ensured, and it is convenient for the light-sensing element 1 to be stacked with the optical filter layer.

In some embodiments of the present disclosure, as shown in FIG. 1, the optical lens includes a plurality of sub optical lenses 3, the plurality of sub optical lenses 3 correspond to the plurality of grooves 111 one to one, and the sub optical lens 3 is directly opposite to the corresponding groove 111. Thus, the visible light and the invisible light can be better focused onto the first light-sensing layer 12 and the second light-sensing layer 13 of the light-sensing element 1.

As shown in FIG. 1 and FIG. 3, a projection of the groove 111 on the optical filter layer 2 is located in a projection of the corresponding sub optical lens 3 on the light-sensing base layer 11. That is, the sub optical lens 3 can completely cover the groove 111 in a direction perpendicular to the optical filter layer 2. Thus, the focusing effect of the sub optical lens 3 on the first light-sensing layer 12 and the second light-sensing layer 13 can be better ensured, and the effect of the first light-sensing layer 12 and the second light-sensing layer 13 receiving the light signals can be ensured.

Further, the plurality of sub optical lenses 3 are integrally formed. Thus, a structure of the optical lens can be simplified, the assembly efficiency can be enhanced, and the production efficiency can be improved.

The electronic device 100 according to the embodiments of the present disclosure is described below with reference to the accompanying drawings.

Figure 6:
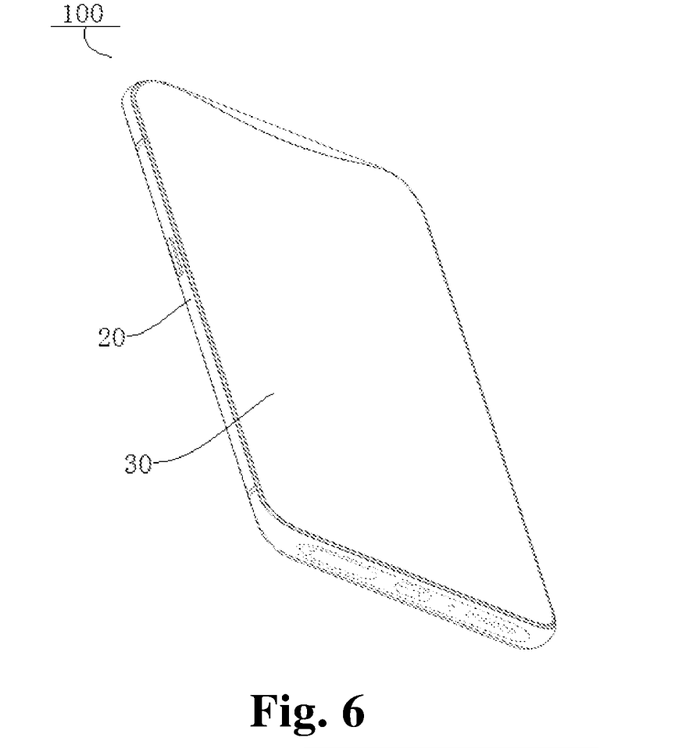
FIG. 6 is a perspective view of an electronic device according to an embodiment of the present disclosure.
Figure 7:
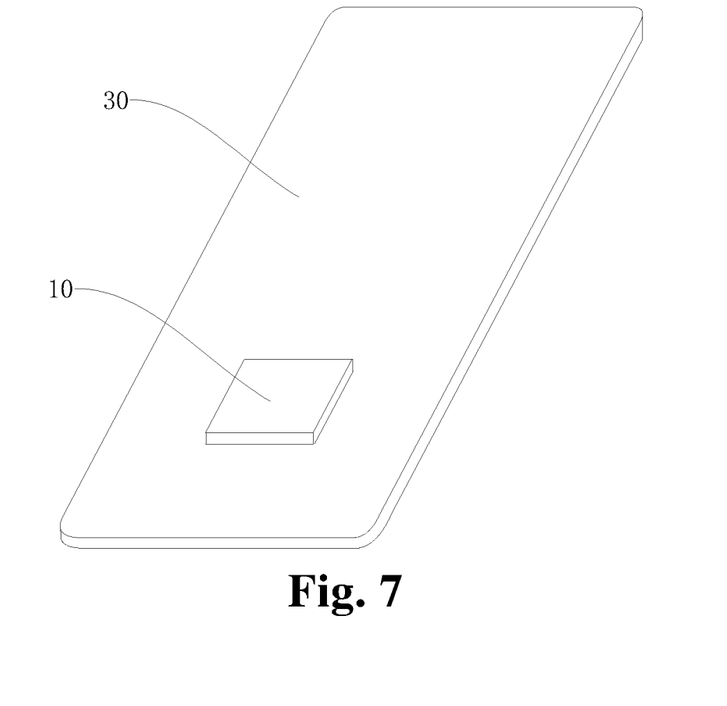
FIG. 7 is a perspective view of a display screen and an optical fingerprint sensor of an electronic device according to an embodiment of the present disclosure.

As shown in FIGS. 6 to 8, the electronic device 100 according to the embodiments of the present disclosure includes a housing 20, a display screen 30, a cover plate 40, an optical fingerprint sensor 10 and an invisible light emitting layer 50.

In some embodiments of the present disclosure, the display screen 30 provides a display function of the electronic device 100. The display screen 30 is arranged to the housing 20, and the display screen 30 and the housing 20 define a mounting space. The cover plate 40 is arranged to the housing 20, and the cover plate 40 is stacked with the display screen 30 and located on a side of the display screen 30 facing away from the mounting space. In some embodiments of the present disclosure, the cover plate 40 can be a glass cover plate, and the cover plate 40 can protect the display screen 30. The optical fingerprint sensor 10 is arranged in the mounting space, the light-sensing base layer 11 is stacked with the display screen 30, and the first light-sensing layer 12 and the second light-sensing layer 13 are arranged on a side of the light-sensing base layer 11 facing towards the display screen 30. The invisible light emitting layer 50 can emit the invisible light towards the cover plate 40. The invisible light emitting layer 50 is arranged between the optical fingerprint sensor 10 and the cover plate 40 and is stacked with the cover plate 40 and the optical fingerprint sensor 10. The invisible light emitting layer 50 is opposite to the optical fingerprint sensor 10.

During an under-screen optical fingerprint identification, the display screen 30 can emit the visible light upwards, and the invisible light emitting layer 50 can emit the invisible light upwards. The visible light and the invisible light are reflected on the surfaces of the false finger and the real finger. The authenticity of the fingerprint to be tested can be effectively distinguished by the image generated by receiving the invisible light such as the invisible light near the red light band reflected by the finger. The false fingerprint can be effectively identified, and the security of the electronic device 100 using the optical fingerprint sensor 10 is improved.

A process of the fingerprint identification of the electronic device according to the embodiments of the present disclosure is described in detail below.

As shown in FIGS. 8 to 10, when the electronic device 100 performs the fingerprint identification, the real finger can be placed on a portion of the cover plate 40 opposite to the optical fingerprint sensor 10, and the display screen 30 can emit the visible light towards the cover plate 40 (as the hollow arrow shown in FIGS. 8 to 10). The visible light reaches the surface of the real finger through the cover plate 40. Due to different reflectivity of the light at a ridge or a valley of the fingerprint, intensities of the light reflected at the ridge or the valley of the fingerprint are also different, and the optical fingerprint sensor 10 generates the fingerprint image through the light with different intensities reflected by the surface of the finger, so as to realize a function of the fingerprint identification. As shown in FIGS. 8 to 10, when a refractive index of the false finger is the same with a refractive index of the real finger and the false finger has the same valley-ridge distribution as the real finger, the optical fingerprint sensor 10 generates the same fingerprint image through the light reflected by the surface of the finger, and the authenticity cannot be distinguished.

However, in the process of the fingerprint identification, the invisible light emitting layer 50 can emit the invisible light towards the cover plate 40 (as shown by the solid arrow in FIGS. 8 to 10), such as the red light. The invisible light reaches the surface of the real finger through the cover plate. Since the real finger has special reflection and absorption characteristics for the invisible light, and the real finger itself can also emit the invisible light near the red light band, the invisible light component reflected by the real finger is great and has a large intensity. The invisible light component is reflected by the real finger and reaches the optical fingerprint sensor 10 to generate the fingerprint image. As shown in FIGS. 8 to 10, the invisible light component reflected by the false finger is small and has a small intensity, the invisible light component is reflected by the false finger and reaches the optical fingerprint sensor 10 to generate the fingerprint image, the fingerprint image has a poor definition, and a shape of the fingerprint image is different from a shape of an actual fingerprint image, so that the authenticity of the fingerprint can be distinguished.

In the electronic device 100 according to the embodiments of the present disclosure, the first light-sensing layer 12 for receiving the visible light is arranged among the grooves 111 of the light-sensing element 1, and the second light-sensing layer 13 for receiving the invisible light is arranged between the inner wall surface of the at least part of the plurality of grooves 111 and the outer wall surface of the first light-sensing layer 12, so that the optical fingerprint sensor 10 can receive both the visible light signal and the invisible light signal. Therefore, the fingerprint image can be generated by receiving the visible light reflected by the finger, and the authenticity of the fingerprint to be tested can be effectively distinguished by the image generated by receiving the invisible light such as the invisible light near the red light band reflected by the finger. The false fingerprint can be effectively identified, and the security of the electronic device 100 using the optical fingerprint sensor 10 is improved.

In some embodiments of the present disclosure, as shown in FIG. 8, the invisible light emitting layer 50 is attached on a surface of the display screen 30 facing towards the mounting space. During an assembling process of the electronic device 100, the invisible light emitting layer 50 can be assembled with the display screen 30 into an assembly for assembling, thus improving the assembling efficiency.

Of course, the present disclosure is not limited to this. As shown in FIG. 9 and FIG. 10, the invisible light emitting layer 50 is arranged between the cover plate 40 and the display screen 30. As shown in FIG. 9, during the assembling process of the electronic device 100, the invisible light emitting layer 50 can be assembled with the cover plate 40 into an assembly for assembling. Of course, as shown in FIG. 10, the invisible light emitting layer 50 can be assembled with the display screen 30 into an assembly for assembling, thus improving the assembling efficiency.

In some embodiments of the present disclosure, an area of the invisible light emitting layer 50 is less than an area of the display screen 30. Thus, the material cost of the invisible light emitting layer 50 can be saved. In some embodiments of the present disclosure, the invisible light emitting layer 50 can be arranged in a region opposite to the optical fingerprint sensor 10. Further, a projection of the invisible light emitting layer 50 on the display screen 30 may overlap with a projection of the optical fingerprint sensor 10 on the display screen 30. Thus, a light supplement effect of the invisible light emitting layer 50 on the invisible light of the optical fingerprint sensor 10 can be ensured, and the material cost of the invisible light emitting layer 50 can be reduced.

Figure 11:
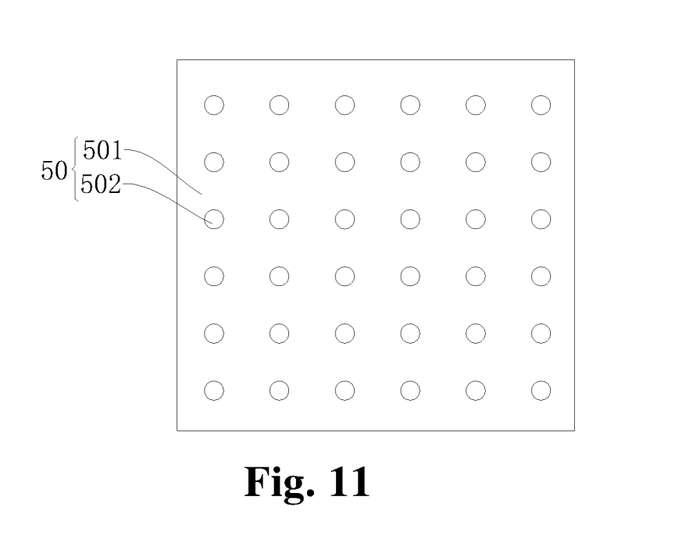
FIG. 11 is a top view of an invisible light emitting layer of an electronic device according to an embodiment of the present disclosure.

Further, as shown in FIG. 11, the invisible light emitting layer 50 includes a substrate 501 and an invisible light emitting unit 502. The substrate 501 is a transparent member, so that it is convenient for the visible light and the invisible light reflected by the finger to be received by the optical fingerprint sensor 10 through the substrate 501. The invisible light emitting unit 502 can emit the invisible light. A plurality of invisible light emitting units 502 are provided, and the plurality of invisible light emitting units 502 are arranged on a surface of the substrate 501 facing towards the cover plate 40 and spaced apart from each other. Thus, the invisible light emitted by the invisible light emitting layer 50 can be relatively uniform, and the imaging effect of the optical fingerprint sensor 10 after receiving the invisible light reflected by the finger can be improved.

Figure 12:
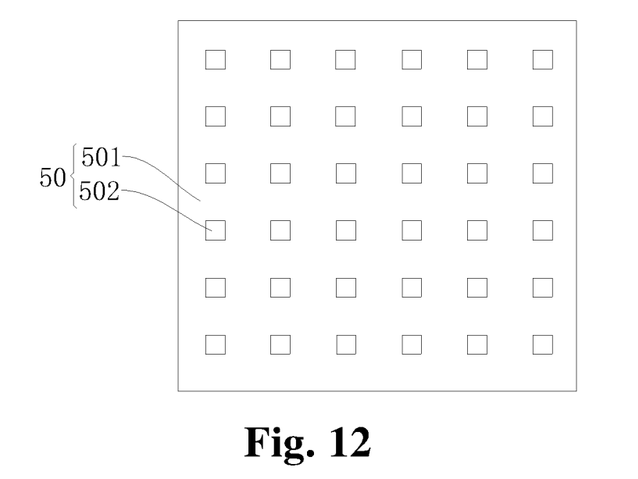
FIG. 12 is a top view of an invisible light emitting layer of an electronic device according to another embodiment of the present disclosure.
Figure 13:
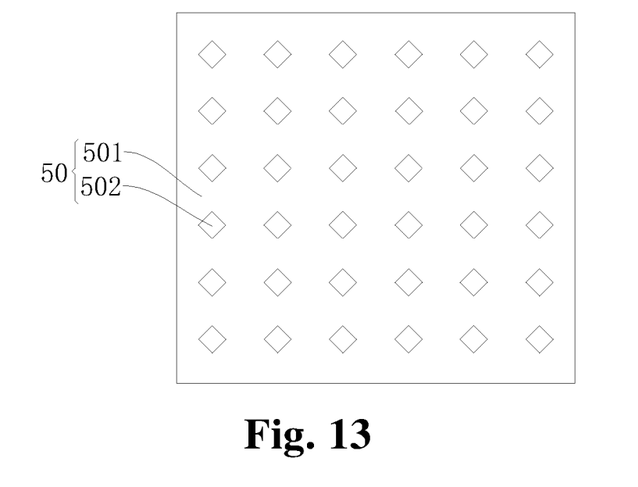
FIG. 13 is a top view of an invisible light emitting layer of an electronic device according to still another embodiment of the present disclosure.
Figure 14:
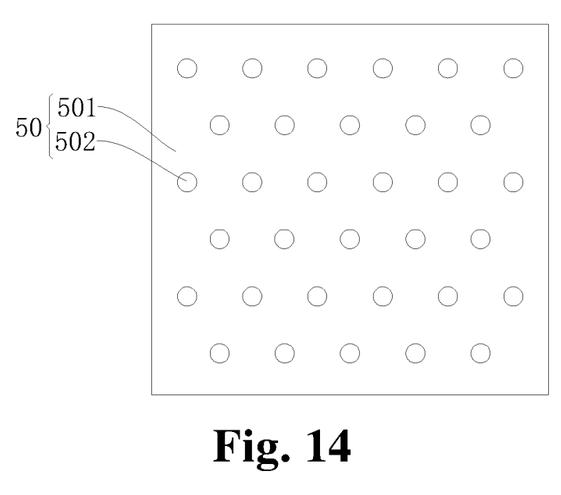
FIG. 14 is a top view of an invisible light emitting layer of an electronic device according to still another embodiment of the present disclosure.

In some embodiments of the present disclosure, as shown in FIGS. 11 to 13, the plurality of invisible light emitting units 502 are arranged in rows and columns. Thus, the plurality of invisible light emitting units 502 can be distributed more regularly, so that the invisible light emitted by the invisible light emitting layer 50 is relatively uniform, and the imaging effect of the optical fingerprint sensor 10 after receiving the invisible light reflected by the finger can be improved. Of course, the present disclosure is not limited to this. As shown in FIG. 14, the plurality of invisible light emitting units 502 can also be randomly distributed.

In some embodiments of the present disclosure, as shown in FIGS. 11 to 13, a section of the invisible light emitting unit 502 parallel to the cover plate 40 is circular, elliptical or polygonal. For example, in examples shown in FIG. 11 and FIG. 13, the section of the invisible light emitting unit 502 parallel to the cover plate 40 is circular. In an example shown in FIG. 12, the section of the invisible light emitting unit 502 parallel to the cover plate 40 is square. In an example shown in FIG. 13, the section of the invisible light emitting unit 502 parallel to the cover plate 40 is rhombic.

In some embodiments of the present disclosure, the display screen 30 includes a plurality of pixel units spaced apart from each other, and the invisible light emitting unit 502 is located in a gap defined by the plurality of pixel units. Thus, it can be ensured that the invisible light emitted by the invisible light emitting unit 502 can be emitted upwards through the gap between two adjacent pixels.

In some embodiments of the present disclosure, a wavelength range of the invisible light that can be received by the second light-sensing layer 13 is less than 1000 mm. The invisible light emitting unit 502 may be an infrared light emitting diode. The invisible light can be infrared light or near-infrared light.

The electronic device 100 according to the present disclosure can effectively identify biological characteristics of the fingerprint according to the invisible light wave energy received by the optical fingerprint sensor 10, and improve the ability of the electronic device 100 resisting attacks from two-dimensional and three-dimensional false fingerprints. The under-screen optical fingerprint sensor 10 adopts a structure in which the first light-sensing layer 12 and the second light-sensing layer 13 are stacked, and a photosensitive region of the light-sensing element 1 can receive both the visible light and the invisible light. The first light-sensing layer 12 in the photosensitive region of the light-sensing element 1 is configured to receive the visible light signal reflected by the fingerprint, and the second light-sensing layer 13 in the photosensitive region of the light-sensing element 1 is configured to receive the invisible light signal emitted and reflected by the finger, so as to acquire two kinds of optical signals in the same light-sensing element 1. Moreover, the electronic device 100 adopts the invisible light emitting layer 50 to supplement light so as to enhance an intensity of the invisible light received by the light-sensing element 1. Through the combination of the above technologies, the under-screen optical fingerprint sensor 10 can effectively identify the false fingerprint and improve the anti-counterfeiting ability of the optical fingerprint sensor 10.

For example, the electronic device 100 may be any one of various types of computer system devices that are mobile or portable and perform wireless communication (only one form is shown by way of example in FIG. 6). In some embodiments of the present disclosure, the electronic device 100 may be a mobile phone or a smart phone (such as a phone based on iPhone®, a phone based on Android®), a portable game device (such as Nintendo DS®, PlayStation Portable®, Gameboy Advance, iPhone®), a laptop, a PDA, a portable internet device, a music player, and a data storage device, other handheld devices such as watches, in ear headphones, pendants, headphones, etc. The electronic device 100 may also be other wearable devices (such as electronic glasses, electronic clothes, electronic bracelets, electronic necklaces, electronic tattoos, electronic devices, or head wearable devices (HMDS) of smart watches).

The electronic device 100 may also be any one of a plurality of electronic devices 100, including but not limited to cellular phones, smart phones, other wireless communication devices, personal digital assistants, audio players, other media players, music recorders, video recorders, cameras, other media recorders, radios, medical equipment, vehicle transportation instruments, calculators, programmable remote controllers, pagers, laptops, desktop computers, printers, netbooks, personal digital assistants (PDA), portable multimedia players (PMP), moving picture expert group (MPEG-1 or MPEG-2) audio layer (mp3) players, portable medical equipment and digital cameras and their combinations.

In some cases, the electronic device 100 may perform a variety of functions (such as playing music, displaying videos, storing pictures, and receiving and sending telephone calls). If needed, the electronic device 100 may be a portable device such as cellular phones, media players, other handheld devices, wrist watch devices, pendant devices, earpiece devices, or other compact portable devices.

In the description of the present disclosure, it shall be noted that unless specified or limited explicitly otherwise, the terms "mounted," "interconnected," "connected" shall be understood broadly, and may be, for example, fixed connections, may also be detachable connections, or integral connections; may be mechanical connections, and may also be electrical connections; may be direct connections or indirect connections via intervening medium, may be inner communications of two elements. For those skilled in the art, the specific meaning of the above terms in the present disclosure can be understood according to specific situations.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example. Moreover, the particular features, structures, materials or characteristic described may be combined in a suitable manner in any one or more embodiments or examples.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. An electronic device, comprising:
  a housing;
  a display screen arranged to the housing and defining a mounting space together with the housing;
  a cover plate arranged to the housing, stacked with the display screen and located on a side of the display screen facing away from the mounting space;
  an optical fingerprint sensor, comprising:
    a light-sensing element comprising:
      a light-sensing base layer having a plurality of grooves formed in a side surface thereof;
      a plurality of first light-sensing layers configured to receive visible light, and corresponding to the plurality of grooves one to one, each first light-sensing layer being arranged in the corresponding groove; and
      a second light-sensing layer configured to receive invisible light, and arranged between an inner wall surface of at least part of the plurality of grooves and an outer wall surface of the first light-sensing layer;
    an optical filter layer stacked with the light-sensing element and located on a side of the light-sensing element where the plurality of grooves are formed; and an optical lens configured for focusing, stacked with the optical filter layer and located on a side of the optical filter layer facing away from the light-sensing element, wherein the optical fingerprint sensor is arranged in the mounting space, and the light-sensing base layer is stacked with the display screen; and an invisible light emitting layer configured to emit invisible light towards the cover plate, arranged between the optical fingerprint sensor and the cover plate, stacked with the cover plate and the optical fingerprint sensor, and opposite to the optical fingerprint sensor.

2. The electronic device according to claim 1, wherein the plurality of grooves are arranged in rows and columns.

3. The electronic device according to claim 2, wherein the groove provided with the second light-sensing layer and the groove not provided with the second light-sensing layer are staggered among the grooves located in the same row.

4. The electronic device according to claim 3, wherein the groove provided with the second light-sensing layer and the groove not provided with the second light-sensing layer are staggered among the grooves located in the same column.

5. The electronic device according to claim 4, wherein the first light-sensing layers in two adjacent rows are staggered.

6. The electronic device according to claim 1, wherein the first light-sensing layer and the second light-sensing layer are flush with a surface of the light-sensing base layer facing towards the optical filter layer.

7. The electronic device according to claim 1, wherein the optical lens comprises a plurality of sub optical lenses, the plurality of sub optical lenses correspond to the plurality of grooves one to one, and the sub optical lens is directly opposite to the corresponding groove.

8. The electronic device according to claim 7, wherein a projection of the groove on the optical filter layer is located in a projection of the corresponding sub optical lens on the light-sensing base layer.

9. The electronic device according to claim 7, wherein the plurality of sub optical lenses are integrally formed.

10. The electronic device according to claim 1, wherein the first light-sensing layer and the second light-sensing layer are photodiodes.

11. The electronic device according to claim 1, wherein the second light-sensing layer is arranged in each groove.

12. The electronic device according to claim 1, wherein the invisible light emitting layer is attached on a surface of the display screen facing towards the mounting space.

13. The electronic device according to claim 1, wherein the invisible light emitting layer is arranged between the cover plate and the display screen.

14. The electronic device according to claim 1, wherein an area of the invisible light emitting layer is less than an area of the display screen.

15. The electronic device according to claim 14, wherein a projection of the invisible light emitting layer on the display screen overlaps with a projection of the optical fingerprint sensor on the display screen.

16. The electronic device according to claim 1, wherein the invisible light emitting layer comprises:

a substrate, the substrate being a transparent member; and a plurality of invisible light emitting units arranged on a surface of the substrate facing towards the cover plate and spaced apart from each other.

17. The electronic device according to claim 16, wherein the plurality of invisible light emitting units are arranged in rows and columns.

18. The electronic device according to claim 16, wherein the display screen comprises a plurality of pixel units spaced apart from each other, and the invisible light emitting unit is located in a gap defined by the plurality of pixel units.

\* \* \* \* \*